Dec. 9, 1947.   B. H. CARROLL ET AL   2,432,468

SUPERSENSITIZED SILVER HALIDE EMULSION

Filed Dec. 29, 1945

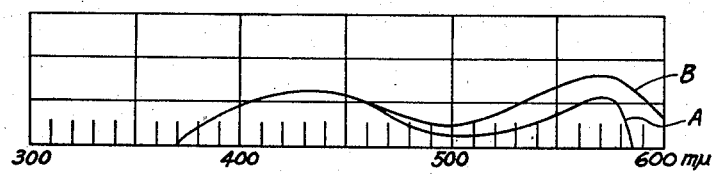

FIG. 1.

A = 1,1'-diethyl-2,2'-cyanine iodide.
B = Combination of bis-(3-ethylrhodanine)methine oxonol with 1,1'-diethyl-2,2'-cyanine iodide.

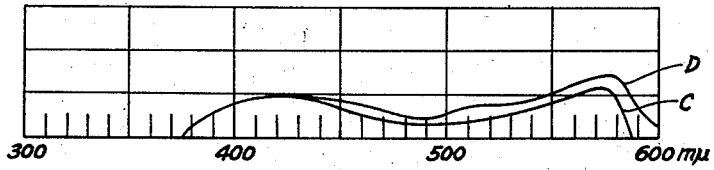

FIG. 2.

C = 1,1'-diethyl-2,2'-cyanine iodide.
D = Combination of bis-(3-methylrhodanine)-γ-methylmethine oxonol with 1,1'-diethyl-2,2'-cyanine iodide

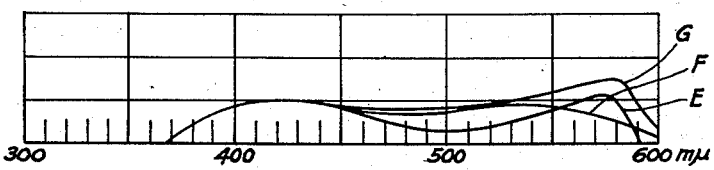

FIG. 3.

E = 1,1'-diethyl-2,2'-cyanine iodide.
F = [3-ethyl-2-thio-2,4(3,5)-oxazoledione] [3-phenyl-rhodanine] methine oxonol.
G = Combination of dyes given under E and F.

BURT H. CARROLL
LESLIE G. S. BROOKER
INVENTORS

UNITED STATES PATENT OFFICE 2,432,468

SUPERSENSITIZED SILVER HALIDE EMULSION

Burt H. Carroll and Leslie G. S. Brooker, Rochester, N. Y., assignors to Eastman Kodak Company, Rochester, N. Y., a corporation of New Jersey Application December 29, 1945, Serial No. 638,491

10 Claims. (Cl. 95—7)

This invention relates to sensitized photographic emulsions and to a process for the preparation thereof.

It is known that photographic silver halide emulsions can be spectrally (optically) sensitized with certain dyes which adsorb directly on the silver halide. It is also known that acid and basic sensitizing dyes are relatively incompatible; for example, sensitization by means of a mixture of eosin dyes and cyanine dyes is generally weaker than the sum of the individual effects produced by eosin dyes (acid) and the cyanine dyes (basic).

It has recently been found, however, that pentamethine oxonol dyes which are acidic in nature can be supersensitized by means of cyanine dyes. See the copending application of Burt H. Carroll and Cyril J. Staud, Serial No. 630,544, filed November 23, 1945. Trimethine oxonol dyes on the other hand are not supersensitized to any appreciable extent by cyanine dyes, nor are monomethine oxonol dyes, such as pyrazolone monomethine dyes.

We have now found that certain monomethine oxonol dyes instead of being supersensitized by cyanine dyes act to supersensitize monomethine cyanine dyes in photographic silver halide emulsions. It is, accordingly, an object of our invention to provide new supersensitized photographic silver halide emulsions. A further object is to provide a process for preparing such emulsions. Other objects will become apparent hereinafter.

In accordance with our invention, we incorporate in a photographic silver halide emulsion at least one monomethine cyanine dye selected from those represented by the following general formula:

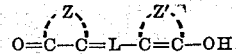

wherein R and R' each represents an alkyl group, especially an alkyl group of the formula $C_nH_{2n+1}$ wherein $n$ represents a positive integer of from 1 to 4, X represents an anion, e. g. chloride, bromide, iodide, methylsulfate, p-toluenesulfonate, etc., Q represents the non-metallic atoms necessary to complete a heterocyclic nucleus containing from 5 to 6 atoms in the heterocyclic ring, especially a nucleus of the quinoline series, a nucleus of the benzothiazole series, a nucleus of the benzoselenazole series or a nucleus of the β-naphthothiazole series and Q' represents the non-metallic atoms necessary to complete a heterocyclic nucleus of the quinoline series, and also incorporate in the emulsion a monomethine oxonol dye selected from those represented by the following general formula and the metal and ammonium (substituted or unsubstituted) salt forms of these dyes:

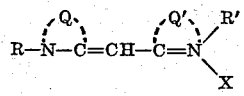

wherein L represents a methine group (substituted or unsubstituted), and Z and Z' each represents the non-metallic atoms necessary to complete a nucleus of the rhodanine series (e. g. rhodanine, 3-methylrhodanine, 3-ethylrhodanine, 3-phenylrhodanine, etc.) or a nucleus of the 2-thio-2,4(3,5)-oxazoledione series (e. g. 3-ethyl-2,4(3,5)-oxazoledione, etc.). The 1,1'-dialkyl-2,2'-cyanine salts are supersensitized to the greatest extent.

We are aware of the fact that certain symmetrical oxonol dyes of the above formula have been proposed as filter dyes. However, we do not employ the dyes in concentrations great enough to produce any practical filter action. As pointed out in British Patent 506,385, dated May 24, 1939, when these oxonol dyes are used as filter dyes, they are employed in such an amount that, with respect to colored light for which the dye has its predominant absorption, the optical density of the material is greater than one. Contrasted with this, we employ the oxonol dyes in practicing our invention, in a concentration of not more than 0.25 gram per gram-mole of silver halide in the emulsion. Usually we employ the oxonol dye in a concentration of from 0.025 to 0.15 gram of dye per gram-mole of silver halide in the emulsion.

The order of addition of the oxonol dye and the monomethine cyanine dye to the emulsion appears to be of no importance and either one or the other may be added to the emulsion first, or the substances may be added to the emulsion together. One or more oxonol dyes can be employed and one or more of the monomethine cyanine dyes can be employed.

The quantity of monomethine cyanine dye employed may be several times greater than the concentration of the oxonol dye. Generally speaking, the most useful concentration of the monomethine cyanine dye is from 2 to 3 times the concentration of the oxonol dye. The most effective concentration of the monomethine will be apparent in any given instance upon making the usual tests and observations customarily employed in the art.

The following examples will serve to illustrate further the manner of practicing our invention.

*Example 1*

To a moderate speed negative type gelatino-silver-bromiodide emulsion were added 1,1'-diethyl-2,2'-cyanine iodide in a concentration of 0.064 g./mole of silver halide in the emulsion, and bis-(3-ethylrhodanine)methine oxonol, in a concentration of 0.021 g./mole of silver halide in the emulsion. The resulting emulsion had a speed (measured by exposure through a filter which transmits substantially no light of wavelength shorter than 500 mu) four times as great as the speed of the same emulsion containing only 1,1'-diethyl-2,2'-cyanine iodide in a concentration of 0.083 g./mole of silver halide in the emulsion, or of the same emulsion containing only the oxonol dye in a concentration of 0.064 g./mole of silver halide in the emulsion.

*Example 2*

To a moderate speed negative type gelatino-silver-bromiodide emulsion were added 1,1'-diethyl-2,2'-cyanine iodide in a concentration of 0.064 g./mole of silver halide in the emulsion, and bis-(3-methylrhodanine)-γ-methylmethine oxonol in a concentration of 0.021 g./mole of silver halide in the emulsion. The resulting emulsion had a speed (measured by exposure through a filter which transmits substantially no light of wavelength shorter than 500 mu) four times as great as the speed of the same emulsion containing only the cyanine dye in a concentration of 0.083 g./mole of silver halide, or of the same emulsion containing only the oxonol dye in a concentration of 0.064 g./mole of silver halide.

*Example 3*

To a moderate speed negative type gelatino-silver-bromiodide emulsion were added 1,1'-diethyl-2,2'-cyanine iodide in a concentration of 0.042 g./mole of silver halide in the emulsion, and [3-ethyl-2-thio-2,4(3,5)-oxazoledione]-[3-phenyl-rhodanine]methine oxonol in a concentration of 0.021 g./mole of silver halide in the emulsion. The resulting emulsion had a speed (measured by exposure through a filter which transmits substantially no light of wavelength shorter than 500 mu) over 3 times as great as the speed of the same emulsion containing only the cyanine dye in a concentration of 0.064 g./mole of silver halide, or of the same emulsion containing only the oxonol dye in a concentration of 0.064 g./mole of silver halide.

The accompanying drawing illustrates the supersensitizing effect obtained with three of our new combinations in silver bromiodide emulsions. Each figure of the drawing is a diagrammatic reproduction of either two or three spectrograms. In Fig. 1, curve A represents the sensitivity of a gelatino-silver-bromiodide emulsion sensitized with 1,1'-diethyl-2,2'-cyanine iodide, and curve B represents the sensitivity of the same emulsion containing a combination of bis-(3-ethyl-rhodanine)methine oxonol with 1,1'-diethyl-2,2'-cyanine iodide. The sensitivity of the emulsion containing only the bis-(3-ethyl-rhodanine)-methine oxonol is not shown since the sensitivity conferred on the emulsion by the oxonol alone is negligible. In Fig. 2, curve C represents the sensitivity of a gelatino-silver-bromiodide emulsion sensitized with 1,1'-diethyl-2,2'-cyanine iodide, and curve D represents the sensitivity of the same emulsion containing a combination of bis-(3-methylrhodanine)-γ-methylmethine oxonol with 1,1'-diethyl-2,2'-cyanine iodide. The sensitivity of the emulsion containing only the bis-(3-methylrhodanine)-γ-methylmethine oxonol is not shown since the sensitivity conferred on the emulsion by the oxonol alone is negligible. In Fig. 3, curve E represents the sensitivity of a gelatino-silver bromiodide emulsion sensitized with 1,1'-diethyl-2,2'-cyanine iodide, curve F represents the sensitivity of the same emulsion sensitized with [3-ethyl-2-thio-2,4(3,5)-oxazoledione][3-phenylrhodanine]methine oxonol, and curve G represents the sensitivity of the same emulsion containing a combination of 1,1'-diethyl-2,2'-cyanine iodide with [3-ethyl-2-thio-2,4(3,5)-oxazoledione][3-phenylrhodanine]-methine oxonol.

In a manner similar to that illustrated in the foregoing examples, emulsions can be supersensitized with the following supersensitizing combinations:

| Oxonol | Monomethine Cyanine |
| --- | --- |
| bis-(3-phenylrhodanine)-methine oxonol. | 1,1'-diethyl-2,2'-cyanine chloride. |
| Do | 1'-ethyl-3-methylthia-2'-cyanine iodide. |
| Do | 1,3-diethyl-4,5-benzothiacyanine p-toluenesulfonate. |
| bis-(3-β-hydroxyethylrhodanine)-methine oxonol. | 1,1'-di-n-propyl-2,2'-cyanine iodide. |
| Do | 1,1'-diethyl-2,2'-cyanine iodide. |
| bis-(3-p-dimethylaminophenyl-rhodanine)methine oxonol. | Do. |
| bis-(3-phenylrhodanine)-5-methylmethine oxonol. | Do. |

The monomethine oxonol dyes and monomethine cyanine dyes can be the incorporated in the emulsions directly or in the form of a solution in a suitable solvent, e. g. methyl alcohol, ethyl alcohol or acetone. The oxonol dyes can also be employed in the form of their metal or ammonium salts. These salts can be formed by adding to the oxonol dye, wet with a little water, methanol or ethanol, an alkali metal hydroxide, such as sodium or potassium hydroxide, or ammonium hydroxide, or an amine, e. g. methylamine, ethylamine, dimethylamine, diethylamine, trimethylamine, triethylamine, ethanolamine, diethanolamine, triethanolamine, pyridine, N-methylpiperidine, n-propylamine, isopropylamine, butylamine, β-ethoxyethylamine, etc. and taking up the salt formed in a suitable solvent, e. g. water, methanol, ethanol, a mixture of water and methanol, a mixture of water and ethanol, etc.

Both the monomethine oxonol dyes and the monomethine cyanine dyes are advantageously added to the washed, finished emulsions and should be uniformly distributed throughout the emulsion.

Our invention is directed primarily to the customarily employed gelatino-silver-halide developing-out emulsions, such as gelatino-silver-chloride, gelatino-silver-chlorobromide, gelatino-silver-iodochloride, gelatino-silver-chlorobromiodide, gelatino-silver-bromide and gelatino-silver bromiodide emulsions.

Emulsions prepared in accordance with our invention can be coated in the usual manner on any suitable support, e. g. glass plates, cellulose acetate film, cellulose nitrate film, polyvinyl acetal resin film, paper support or metal support.

Monomethine cyanine dyes are described and defined in The Theory of the Photographic Process, C. E. Kenneth Mees, The MacMillan Company, New York (1942).

What we claim as our invention and desire to be secured by Letters Patent of the United States is:

1. A photographic silver halide emulsion sensitized with a supersensitizing combination of at least one monomethine cyanine salt selected from those represented by the following general formula:

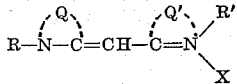

wherein R and R' each represents a primary alkyl group of the formula $C_nH_{2n+1}$ wherein $n$ represents a positive integer of from 1 to 4, X represents an anion, and Q represents the non-metallic atoms necessary to complete a heterocyclic nucleus selected from the group consisting of heterocyclic nuclei of the quinoline series, heterocyclic nuclei of the benzothiazole series, heterocyclic nuclei of the benzoselenazole series and heterocyclic nuclei of the $\beta$-naphthothiazole series and Q' represents the non-metallic atoms necessary to complete a nucleus of the quinoline series and, as a supersensitizer for the cyanine salt, in a concentration of not more than 0.25 gram per mole of silver halide in the emulsion, at least one monomethine oxonol dye selected from the group consisting of those represented by the following general formula and the alkali metal and ammonium salt forms of these oxonol dyes:

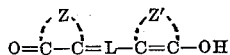

wherein Z and Z' each represents the non-metallic atoms necessary to complete a heterocyclic nucleus selected from the group consisting of those of the rhodanine series and those of the 2-thio-2,4(3,5)-oxazoledione series and L represents a member selected from the group consisting of the methine and the methylmethine group.

2. A photographic gelatino-silver-bromiodide developing-out emulsion sensitized with a supersensitizing combination of at least one monomethine cyanine salt selected from those represented by the following general formula:

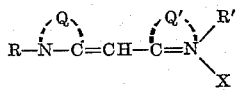

wherein R and R' each represents an alkyl group of the formula $C_nH_{2n+1}$ wherein $n$ represents a positive integer of from 1 to 4, X represents an anion and Q and Q' each represents the non-metallic atoms necessary to complete a heterocyclic nucleus of the quinoline series, and, as a supersensitizer for the cyanine salt, in a concentration of not more than 0.25 gram per mole of silver halide in the emulsion, at least one monomethine oxonol dye selected from the group consisting of those represented by the following general formula and the alkali metal and ammonium salt forms of these dyes:

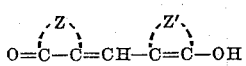

wherein Z and Z' each represents the non-metallic atoms necessary to complete a nucleus of the rhodanine series.

3. A photographic gelatino-silver-bromiodide developing-out emulsion sensitized with a supersensitizing combination of at least one monomethine cyanine salt selected from those represented by the following general formula:

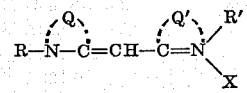

wherein R and R' each represents an alkyl group of the formula $C_nH_{2n+1}$ wherein $n$ represents a positive integer of from 1 to 4, X represents an anion and Q and Q' each represents the non-metallic atoms necessary to complete a heterocyclic nucleus of the quinoline series, and, as a supersensitizer for the cyanine salt, in a concentration of not more than 0.25 gram per mole of silver halide in the emulsion, at least one monomethine oxonol dye selected from the group consisting of those represented by the following general formula and the alkali metal and ammonium salt forms of these dyes:

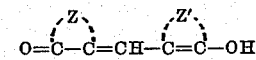

wherein Z represents the non-metallic atoms necessary to complete a nucleus of the rhodanine series and Z' represents the non-metallic atoms necessary to complete a heterocyclic nucleus of the 2-thio-2,4(3,5)-oxazoledione series.

4. A photographic gelatino-silver-bromiodide developing-out emulsion sensitized with a supersensitizing combination of at least one monomethine cyanine salt selected from those represented by the following general formula:

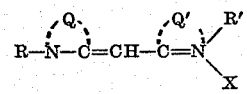

wherein R and R' each represents an alkyl group of the formula $C_nH_{2n+1}$ wherein $n$ represents a positive integer of from 1 to 4, X represents an anion and Q and Q' each represents the non-metallic atoms necessary to complete a heterocyclic nucleus of the quinoline series, and, as a supersensitizer for the cyanine salt, in a concentration of not more than 0.25 gram per mole of silver halide in the emulsion, at least one monomethine oxonol dye selected from the group consisting of those represented by the following general formula and the alkali metal and ammonium salt forms of these dyes:

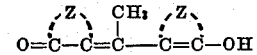

wherein Z represents the non-metallic atoms necessary to complete a rhodanine nucleus.

5. A photographic gelatino-silver-bromiodide developing-out emulsion sensitized with a supersensitizing combination of a 1,1'-diethyl-2,2'-cyanine salt and, as a supersensitizer for the cyanine salt, in a concentration of not more than 0.25 gram per mole of silver halide in the emulsion, bis-(3-ethylrhodanine) methine oxonol.

6. A photographic gelatino-silver-bromiodide developing-out emulsion sensitized with a supersensitizing combination of a 1,1'-diethyl-2,2'-cyanine salt, and, as a supersensitizer for the cyanine salt, in a concentration of not more than 0.25 gram per mole of silver halide in the emulsion, bis-(3-methylrhodanine)-$\gamma$-methylmethine oxonol.

7. A photographic gelatino-silver-bromiodide developing-out emulsion sensitized with a supersensitizing combination of a 1,1'-diethyl-2,2'-cyanine salt and, as a supersensitizer for the cyanine salt, in a concentration of not more than 0.25 gram per mole of silver halide in the emulsion, [3-ethyl-2-thio-2,4(3,5)-oxazoledione][3-phenylrhodanine]methine oxonol.

8. A photographic gelatino-silver-bromiodide developing-out emulsion sensitized with a supersensitizing combination of 1,1'-diethyl-2,2'-cyanine iodide and, as a supersensitizer for the cyanine iodide, in a concentration of not more than 0.25 gram per mole of silver halide in the emulsion, [3-ethyl-2-thio-2,4(3,5)-oxazoledione]-[3-phenylrhodanine]methine oxonol.

9. A photographic gelatino-silver-bromiodide developing-out emulsion sensitized with a supersensitizing combination of 1,1'-diethyl-2,2'-cyanine iodide and, as a supersensitizer for the cyanine iodide, in a concentration of not more than 0.25 gram per mole of silver halide in the emulsion, bis-(3-ethylrhodanine)methine oxonol.

10. A photographic gelatino-silver-bromiodide developing-out emulsion sensitized with a supersensitizing combination of 1,1'-diethyl-2,2'-cyanine iodide and, as a supersensitizer for the cyanine iodide, in a concentration of not more than 0.25 gram per mole of silver halide in the emulsion, bis-(3-methylrhodanine)-$\gamma$-methylmethine oxonol.

BURT H. CARROLL.
LESLIE G. S. BROOKER.

REFERENCES CITED

The following references are of record in the file of this patent:

UNITED STATES PATENTS

| Number | Name | Date |
|---|---|---|
| 2,159,565 | Mees | May 23, 1939 |